(12) United States Patent
Seichter

(10) Patent No.: US 10,146,299 B2
(45) Date of Patent: Dec. 4, 2018

(54) FACE TRACKING FOR ADDITIONAL MODALITIES IN SPATIAL INTERACTION

(71) Applicant: QUALCOMM Incorporated, San Diego, CA (US)

(72) Inventor: Hartmut Seichter, Bad Liebenstein (DE)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 14/535,132

(22) Filed: Nov. 6, 2014

(65) Prior Publication Data

US 2015/0130704 A1    May 14, 2015

Related U.S. Application Data

(60) Provisional application No. 61/902,025, filed on Nov. 8, 2013.

(51) Int. Cl.
*G06F 3/01*    (2006.01)
*G06F 3/0481*    (2013.01)
*G06K 9/00*    (2006.01)

(52) U.S. Cl.
CPC .............. *G06F 3/011* (2013.01); *G06F 3/012* (2013.01); *G06F 3/013* (2013.01); *G06F 3/04815* (2013.01); *G06K 9/00315* (2013.01); *G06K 9/00604* (2013.01)

(58) Field of Classification Search
CPC .............................. G06F 3/011; G06F 3/04815
See application file for complete search history.

(56) References Cited

U.S. PATENT DOCUMENTS

| | | | | |
|---|---|---|---|---|
| 6,842,175 B1* | 1/2005 | Schmalstieg | ........... | G06F 3/011 345/427 |
| 9,117,102 B2* | 8/2015 | Thomas | ............. | G06K 9/00134 |
| 9,230,326 B1* | 1/2016 | Liu | ............ | G06T 7/80 |
| 2002/0075286 A1* | 6/2002 | Yonezawa | ............ | H04N 13/398 345/679 |
| 2003/0158654 A1* | 8/2003 | Morita | ..................... | G06F 3/011 702/150 |
| 2009/0313584 A1 | 12/2009 | Kerr et al. | | |

(Continued)

FOREIGN PATENT DOCUMENTS

| | | |
|---|---|---|
| CN | 102239460 A | 11/2011 |
| CN | 102884490 A | 1/2013 |
| WO | 2011109126 A1 | 9/2011 |

OTHER PUBLICATIONS

International Search Report and Written Opinion—PCT/US2014/064625—ISA/EPO—dated Feb. 6, 2015.

*Primary Examiner* — Patrick Edouard
*Assistant Examiner* — Peijie Shen
(74) *Attorney, Agent, or Firm* — Muncy, Geissler, Olds & Lowe, P.C.

(57) ABSTRACT

A user device receives an image stream from the user side of the user device and an image stream from a target side of the user device. The user device acquires a coordinate system for the user, acquires its own coordinate system, and relates the two coordinate systems to a global coordinate system. The user device then determines whether the user has moved and/or whether the user device has moved. Movement of the user and/or the user device is used as input modalities to control the user's interactions in the augmented reality environment.

35 Claims, 7 Drawing Sheets

(56) References Cited

U.S. PATENT DOCUMENTS

| | | |
|---|---|---|
| 2009/0322671 A1 | 12/2009 | Scott et al. |
| 2010/0066763 A1 | 3/2010 | MacDougall et al. |
| 2010/0125816 A1 | 5/2010 | Bezos |
| 2011/0006978 A1* | 1/2011 | Yuan ........................ G06F 3/013 345/156 |
| 2011/0115883 A1* | 5/2011 | Kellerman .............. G06F 3/012 348/46 |
| 2011/0175932 A1* | 7/2011 | Yu ............................ G06F 3/013 345/661 |
| 2011/0216002 A1* | 9/2011 | Weising ................... G09G 5/08 345/158 |
| 2011/0216060 A1* | 9/2011 | Weising ................... G09G 5/08 345/419 |
| 2012/0121126 A1 | 5/2012 | Hwang et al. |
| 2012/0140202 A1* | 6/2012 | Rothenberger ....... G01S 7/4817 356/4.01 |
| 2012/0304059 A1* | 11/2012 | McCloskey ............. G06F 3/011 715/709 |
| 2013/0121559 A1 | 5/2013 | Hu et al. |
| 2013/0159935 A1* | 6/2013 | Evans ................. G06F 3/04815 715/850 |
| 2013/0275077 A1 | 10/2013 | Kim et al. |
| 2013/0286161 A1 | 10/2013 | Lv et al. |
| 2014/0019299 A1* | 1/2014 | Stewart ............ H04N 21/23614 705/26.8 |
| 2014/0068526 A1* | 3/2014 | Figelman ................ G06F 3/167 715/863 |
| 2014/0092005 A1* | 4/2014 | Anderson ............... G06F 3/011 345/156 |
| 2014/0098126 A1* | 4/2014 | Fein ........................ G06T 11/00 345/633 |
| 2014/0099017 A1* | 4/2014 | Tsai ........................ G06T 17/00 382/154 |
| 2014/0168261 A1* | 6/2014 | Margolis ................ G06F 3/011 345/633 |
| 2014/0316543 A1* | 10/2014 | Sharma ................. G06F 3/1454 700/94 |
| 2014/0325413 A1* | 10/2014 | Delfino ............... G06F 3/04815 715/768 |
| 2015/0009238 A1* | 1/2015 | Kudalkar ................. G09G 3/20 345/661 |
| 2015/0116463 A1* | 4/2015 | Torma ................. H04N 13/296 348/47 |

* cited by examiner

FACE TRACKING FOR ADDITIONAL MODALITIES IN SPATIAL INTERACTION

CLAIM OF PRIORITY UNDER 35 U.S.C. § 119

The present Application for Patent claims priority to Provisional Application No. 61/902,025 entitled SPATIAL INTERACTION USING FACE TRACKING, filed Nov. 8, 2013, by the same inventors as the subject application, assigned to the assignee hereof and hereby expressly incorporated by reference herein in its entirety.

BACKGROUND

Spatial interaction with hand-held user devices is becoming increasingly popular in that quite a number of users are choosing them as point-and-shoot camera devices. However, use of these user devices commonly requires that a user hold the user device in a two-handed grip, even for lightweight user devices such as tablets, phablets, smart phones, and the like. Using these and other user devices in an augmented reality environment can be even more challenging.

SUMMARY

In general, one implementation of the subject matter disclosed herein includes an apparatus for performing spatial interaction between a user and a user device. The apparatus includes logic configured to detect and track in a first coordinate system a position and orientation of a face of the user relative to the user device, and logic configured to detect and track in a second coordinate system a position and orientation of the user device relative to a target. The apparatus also includes logic configured to combine the first coordinate system and the second coordinate system into a global coordinate system and continuously track the face of the user using the detected position and orientation of the face of the user, the detected position and orientation of the user device, and the global coordinate system.

Another implementation of the subject matter disclosed herein includes a method for performing spatial interaction of a user and a user device. The method comprises detecting and tracking in a first coordinate system a position and orientation of a face of the user relative to the user device in a first coordinate system, detecting and tracking in a second coordinate system a position and orientation of the user device relative to a target in a second coordinate system, combining the first coordinate system and the second coordinate system into a global coordinate system, and continuously tracking the face of the user using the detected face of the user, the detected position of the user device, and the global coordinate system.

Another implementation of the subject matter disclosed herein includes an apparatus for performing spatial interaction of a user and a user device. The apparatus comprises means for detecting and tracking in a first coordinate system a position and orientation of a face of the user relative to the user device in a first coordinate system, means for detecting and tracking in a second coordinate system a position and orientation of the user device relative to a target in a second coordinate system, means for combining the first coordinate system and the second coordinate system into a global coordinate system, and means for continuously tracking the face of the user using the detected face of the user, the detected position of the user device, and the global coordinate system.

Another implementation of the subject matter disclosed herein includes computer-readable storage medium including data that, when accessed by a machine, cause the machine to perform operations comprising detecting and tracking in a first coordinate system a position and orientation of a face of the user relative to the user device in a first coordinate system, detecting and tracking in a second coordinate system a position and orientation of the user device relative to a target in a second coordinate system, combining the first coordinate system and the second coordinate system into a global coordinate system, and continuously tracking the face of the user using the detected face of the user, the detected position of the user device, and the global coordinate system.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
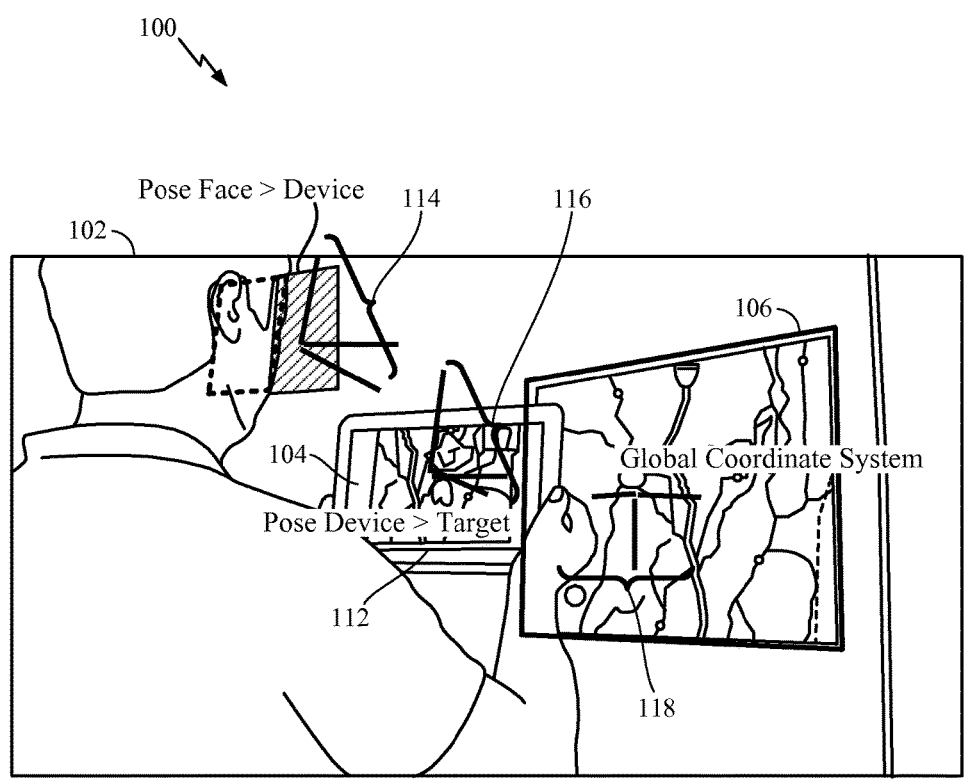
FIG. 1 illustrates an augmented reality environment according to implementations of the technology described herein.

The technology described herein includes a mechanism for interaction between a screen side of a user device and a camera side of the user device, in an augmented reality environment, for example. As used herein, the term "Augmented Reality" is intended to mean any environment that combines real-world imagery with computer-generated data, and superimposes graphics, audio, and other sensory inputs onto the real world.

Operating user devices in an augmented reality environment can be challenging because, among other things, the user device should be spatially registered towards the augmented reality scene. Because the user holds the user device in a two-handed grip, however, there are limited input modalities for the user device since on-screen menus, labels, widgets, etc., need to be accessed with the user's hand.

In one aspect, a camera in a user device receives an image stream, which may be constant, from a user side (or in front) of the user device and an image stream from a target side (or behind) of the user device. The camera may detect eyes, the mouth, nose holes, cheeks, etc., on the user's face. In one aspect, the user device acquires a coordinate system for the user relative to the user device, acquires its own coordinate system relative to the target, and combines the two coordinate systems into a global coordinate system. The user device then determines whether the user has moved and/or whether the user device has moved. Movement of the user and/or the user device is used as input modalities to control the user's interactions in the augmented reality environment.

In one or more implementations, the user device interprets six degrees of freedom in front of the user device and behind the user device. The user device maps each of these degrees of freedom to a separate input modality, resulting twelve input modalities. The input modalities may include a voice, lip movement, eye movement, speech, gestures, smirks, gazes, head movements, face movements, body movements, keyboard input, input from a digitizing tablet, etc. The input modalities also may include information that can be inferred from a user's face, a user's head position, a user's proximity to the user device, etc., which may affect the interaction space between the user device and the target.

In one or more aspects, mappings in front of the user device and behind the user device allow the augmented reality environment to be controlled by the user holding the user device (walking up to the target) or the user moving his or her head (using face tracking). In one or more implementations, mappings in front of the user device and behind the user device also may be combined with other input modalities. For example, a user's face posture may be ray casted into a scene. The user's face posture may then be combined with a voice input from the user. Alternatively, the user's face posture may be combined with a user's blink input, speech input, gaze input, as well as with the user device's position and/or orientation. Speech input may be used to refer to objects in the scene. A user's gaze may be used to determine where the user is actually looking. Still another input modality may include the position and/or orientation of the user device in space.

In one or more implementations, the user device detects and tracks the user's face relative to the user device. The user device also detects and tracks the user device relative to the target. The user device then maps the proximity and direction of the user's face towards the user device.

Mapping of the proximity and direction of the user's face towards the user device may be accomplished by changing the level of detail of the information shown on the display of the user device. For instance, depending on the user's proximity to the user device the details shown in the augmented reality scene behind the user device may adapt to being more or less detailed accordingly.

Mapping of the proximity and direction of the user's face towards the user device may be accomplished by looking inside a target object in the augmented reality scene using an automated explosion diagram and/or x-ray technology. For example, generating automated three-dimensional (3D) models of one or more objects on the target may include organizing the object into an explosion graph that encodes how the object's parts explode with respect to each other. The automated three-dimensional (3D) model allows the user to interactively explore the exploded views using both direct controls and higher-level interaction modes.

In one implementation, a user's gaze may directly control the path that the exploded parts move along on the target. In another implementation, the relation between the user's gaze and the exploded model may be used as a primary control and another modality (e.g., voice, touch etc.) may be used as a secondary control that change the state of an exploded part near an intersection point of the user's gaze in the explosion diagram.

Mapping of the proximity and direction of the user's face towards the user device also may be accomplished using a transparent and/or semi-transparent user interface element, or "magic lens," that is placed over a region of interest in an object on the target to change its appearance and/or its interactive behavior. This so-called "magic lens" can be used to view the top of one or more objects to assist in mapping.

FIG. 1 illustrates an augmented reality environment 100 according to one or more implementations of the technology described herein. In the augmented reality environment 100, a user's view of the real world is enhanced with virtual computer-generated graphics. The graphics are spatially registered and spatially extend into the augmented reality environment 100 so that they appear aligned with the real world from the perspective of the user.

The illustrated augmented reality environment 100 includes a user 102, a user device 104, and a target 106. A scene from the target 106 is shown on a display 112 on the user device 104. The illustrated environment 100 also includes a coordinate system 114, a coordinate system 116, and a coordinate system 118.

In one or more implementations, the augmented reality environment 100 may be used in a gaming setting, an instructional setting, industrial design, sports and entertainment, a medical environment, or other suitable environment that can benefit from the use of augmented reality technology.

In one or more implementations, the user 102 may be any human user of the user device 104. As such, the user 102 can interact with the user device 104 using a variety of input modalities. Of course, the user 102 can be any mechanical device such as a robot capable of interacting with the user device 104, under the control of a human, for example.

In one or more implementations, the user device 104 may be any user equipment such as telephones, tablet computers, "phablet (phone+tablet)" computers, smart phones, laptop and desktop computers, and the like. In one or more implementations, the user device 104 includes one or more orientation sensing modules, cameras, wireless transceivers, graphics engines, processors, user interfaces (e.g. display 112, keypad), eye movement detection modules, hand movement detection modules, voice detection module, speech recognition module, facial expression recognition module, head tracking module, and the like.

In one or more implementations, the target 106 may be a place, object, general direction, person, or other similar item. The target 106 may be stationary or moving.

The illustrated display 112 may be a touch screen display, a holographic display, etc., that is capable of displaying text, images, and the like.

The illustrated coordinate system 114 a face-to-device coordinate system (in front of the user device). The coordinate system 114 is the coordinate system for the user 102 relative to its orientation in space. In one or more implementations, the coordinate system 114 detects and tracks the position and orientation of the user 102's face with respect to the user device 104.

The illustrated coordinate system 116 is a device-to-target coordinate system (behind the user device). The coordinate system 116 is the coordinate system for the user device 104 relative to its orientation in space. In one or more implementations, the coordinate system 114 detects and tracks the position and orientation of the user device 104 with respect to the target 106.

The coordinate system 114 and the coordinate system 116 are combined to generate the coordinate system 118. The illustrated coordinate system 118 is a global coordinate system (or real world coordinate system). The user device 104 uses the coordinate system 118 to determine whether an orientation is a relative orientation or an absolute orientation.

The user device 104 also uses the coordinate system 118 to determine whether the user 102 has moved, whether the user device 104 has moved, or whether both the user 102 and the user device 104 have moved. In one aspect, the user device 104 determines whether the user 102 has moved, whether the user device 104 has moved, or whether both the user 102 and the user device 104 have moved without using sensors. Commonly, sensors may only determine whether or not the user device 104 has moved.

With the arrangement depicted in FIG. 1 it is possible to compute six degrees of freedom pose of the user 102's face towards the user device 104 because the user 102 can move his head, turn his head, move the user device 104, and turn the user device 104, and the user device 104 can detect and interpret the movements. In one or more implementations, the user device 104 maps each of these degrees of freedom to a separate input modality, resulting twelve input modalities.

Figure 2:
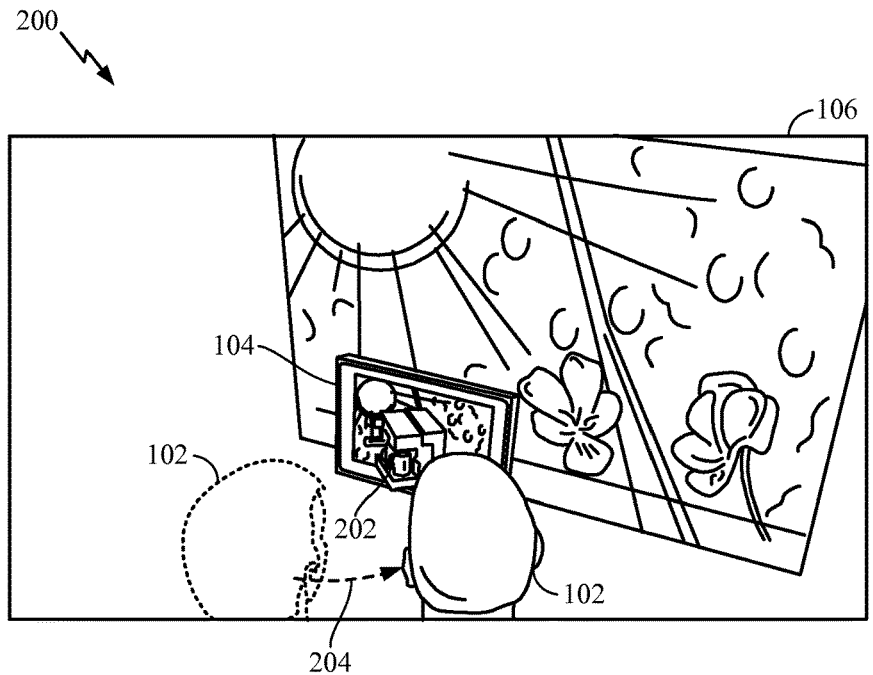
FIG. 2 illustrates an augmented reality environment according to alternative implementations of the technology described herein.

FIG. 2 illustrates an augmented reality environment 200 according to an implementation of the technology described herein. The illustrated augmented reality environment 200 includes the user 102, the user device 104, and the target 106. The user device 104 is displaying an object 202 from the target 106 on the display 112 of the user device 104. In the illustrated augmented reality environment 200, the object 202 is a coffee maker. The user 102 observes the object 202 from occluded sides. In the illustrated augmented reality environment 200, the user 102 moves his or her head along the direction of the arrow 204. The movement along the direction of the arrow 204 is the source of an input modality and the object 202 is the action object.

The user 102's position in front of the user device 104 is mapped to the orientation of the object 202. In the illustrated implementation, the head-pose of the user 102 towards the screen on the display is mapped to the orientation of the object 202 in reverse direction. As such, when the user 102 moves his or her head to the right along the direction of the arrow 204, the object 202 turns to the left. This allows the user 102 to observe the object 202 from various angles. Moreover, as the user device 104 moves towards the target 106 the object 202 remains in the physical space at the same position. However, the object 202's orientation is changed as the orientation of between the user 102 and the user device 104 changes.

Figure 3:
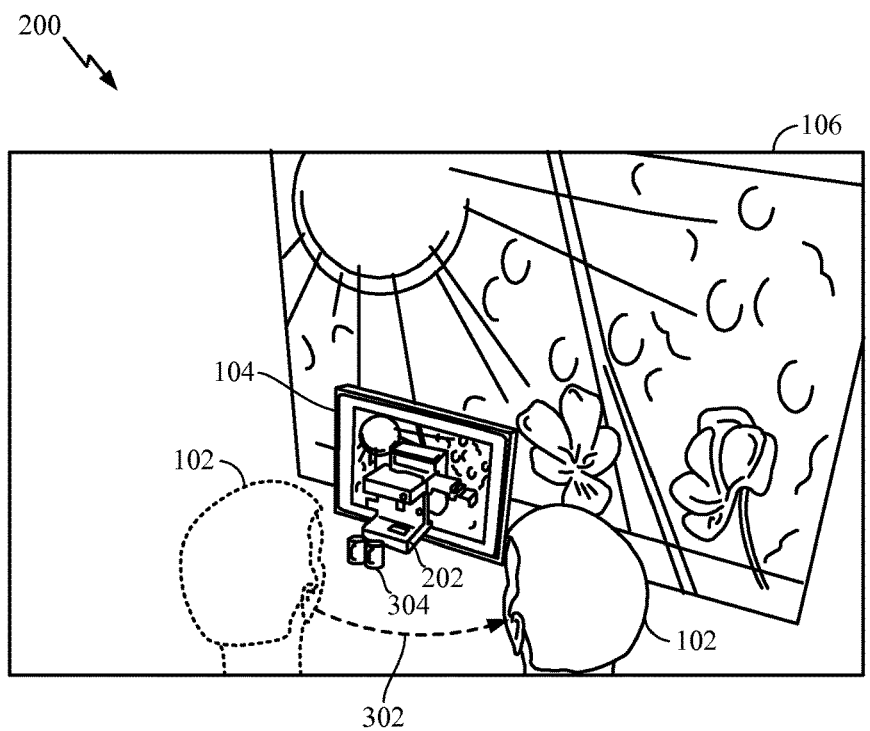
FIG. 3 illustrates the augmented reality environment depicted in FIG. 2 according to another implementation of the technology described herein.

FIG. 3 illustrates the augmented reality environment 200 as well, including the user 102, the user device 104, and the target 106. The user device 104 is displaying the object 202 from the target 106 on the display 112 of the user device 104. However, in FIG. 3, the user 102 has moved aside along the direction of the arrow 302 to reveal parts of the object 202 and its underlying structure, which are illustrated as coffee cups 304. The coffee cups 304 are arranged according to the head posture of the user 102 in order to optimize the visibility of the object 202 to the user 102. In this implementation, the user device 104 can display where the user 102 is looking.

In one or more aspects, the user 102's gaze provides one input modality and the user 102's movement along the direction of the arrow 302 provides another input modality. The user device 104 maps the proximity and direction of the user 102's face towards the user device 104 to change the level of detail of the object 202. In the illustrated implementation, the user device 104 uses the user 102's gaze to adjust the level of detail of the object 202 to show the coffee cups 304 in more detail. In one implementation, a camera (not shown) in the user device 104 explodes a region of interest of the object 202 to allow the user 102 to view the coffee cups 304.

Figure 4:
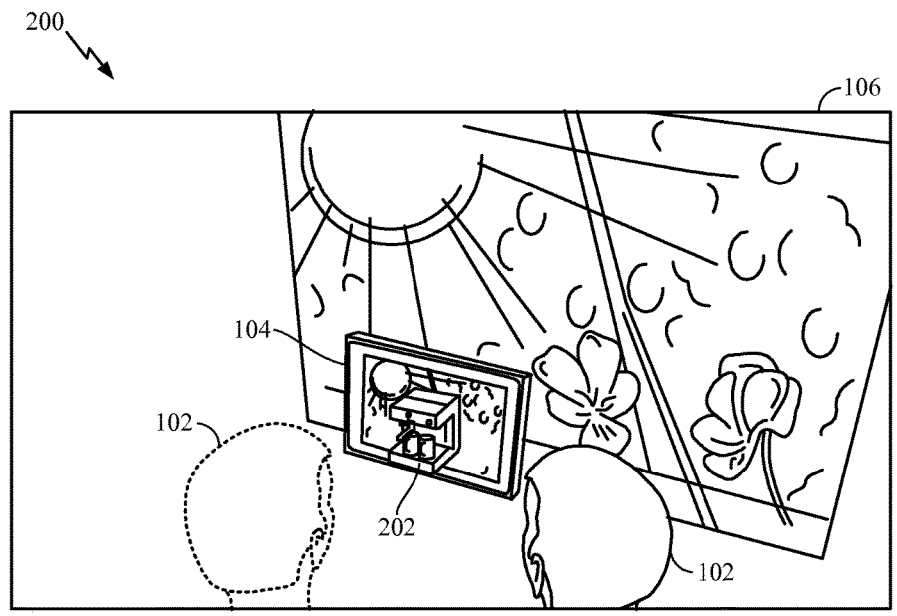
FIG. 4 illustrates the augmented reality environment depicted in FIG. 2 according to another implementation of the technology described herein.

FIG. 4 illustrates the augmented reality environment 200 including the user 102, the user device 104, and the target 106. The user device 104 is displaying the object 202 from the target 106 on the display 112 of the user device 104. However, in this implementation of the augmented reality environment 200 labels and/or virtual objects (not shown) are used. Although not shown, labels on the object 202 may be arranged in a billboard manner according to the head pose of the user 102. The labels, however, should be arranged according to the line of sight and towards the user 102 so that the user 102 can actually see the object 202. Additionally, the labels should not occlude directly into the user 102's line of sight or collide with the object 202.

In one or more implementations, the user device 104 uses the gaze and/or line of sight of the user 102 (i.e., collision information) as an input modality to change the positions and/or orientations of the labels to enable the user 102 to effectively view the object 202. The user device 104 may detect blinking of the user 102, which may then be mapped to switch on and off any labels. As an example, labels with closest proximity to the user 102's line of sight may be excluded from being rendered on the user device 104.

Figure 5:
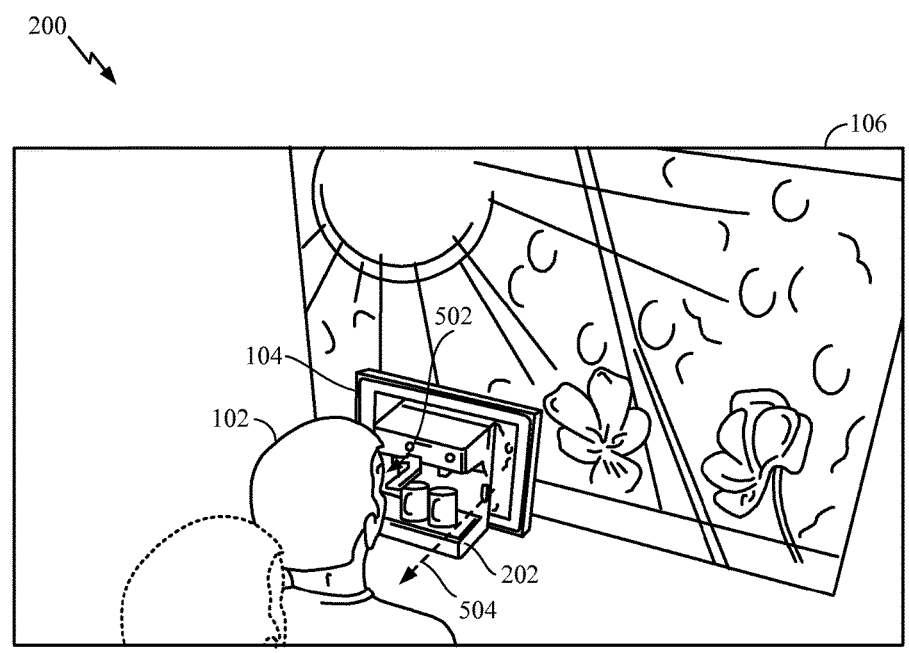
FIG. 5 illustrates the augmented reality environment depicted in FIG. 2 according to another implementation of the technology described herein.

FIG. 5 illustrates the augmented reality environment 200 in which a semantic zoom is implemented. The augmented reality environment 200 depicted in FIG. 5 also includes the user 102, the user device 104, and the target 106. The user device 104 is displaying the object 202 from the target 106 on the display 112 of the user device 104. However, in the implementation illustrated in FIG. 5 parts of the object 202 that are in a center point 502 of the head pose of the user 102 are zoomed up along the arrow 504 to allow the user 102 a close-up inspection of the object 202 without the user 102 moving closer to the target 106. The user 102's gaze may be used to zoom into the object 202.

The augmented reality environment 200 depicted in FIG. 5 also may determine whether the user 102 has moved (one input modality) or the user device 104 has moved (another input modality). A separate user interface on the user device 104 may be used to map these input modalities separately.

For example, the user device 104 may use the coordinate system 114 (face-to-device), the coordinate system 116 (device-to-target), and the global coordinate system 118 (all shown in FIG. 1) to determine whether the orientation of the user 102 and/or the user device 104 is a relative orientation or an absolute orientation. The user device 104 may compute orientation differences to determine whether the user 102 has moved, whether the user device 104 has moved, or whether both have moved. This may computation may be accomplished without using sensors, which is advantageous because sensors may only determine whether the user device 104 has moved.

Figure 6:
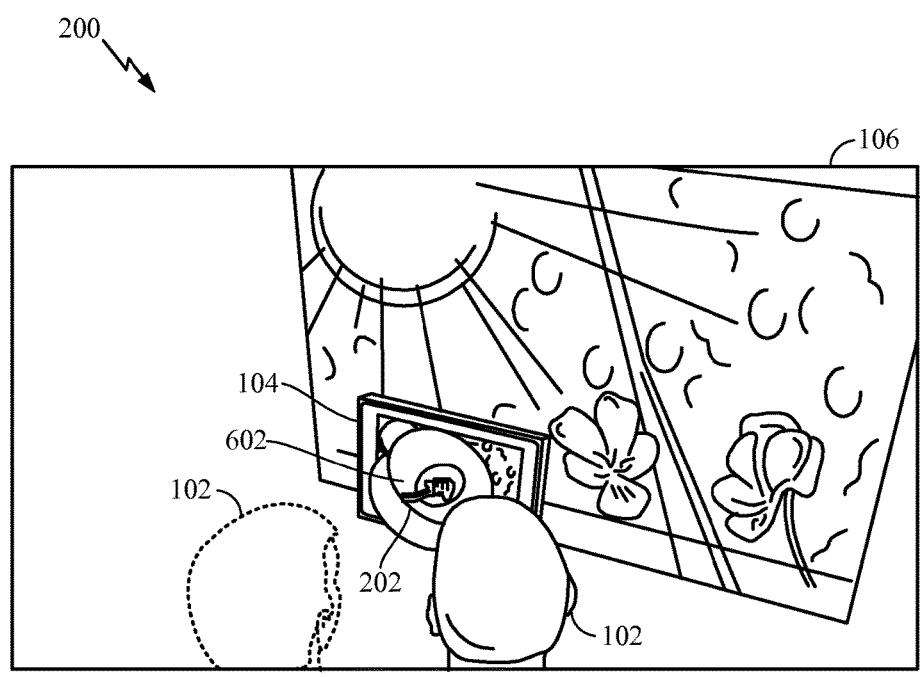
FIG. 6 illustrates the augmented reality environment depicted in FIG. 2 according to another implementation of the technology described herein.

FIG. 6 illustrates the augmented reality environment 200 according to another implementation of the technology described herein in which a suitable magic lens (not shown) is implemented. For example, in the illustrated implementation parts of the object 202 are highlighted based on the head pose of the user 102 intersected with the object 202's bounding volume 602. Commonly, there are only two degrees of freedom using a conventional magic lens because the magic lens is screen-aligned. According to some implementations, using one or more modalities within the coordinate permits the magic lens to move accordingly. For example, there can be different layers that are actually depicted on the real world screen. As a result, the additional modalities permit switching the content of the magic lens and moving the magic lens with up to six degrees of freedom. The six degrees of freedom are enabled using the gaze of the user 102 or the line of sight of the user 102.

Figure 7:
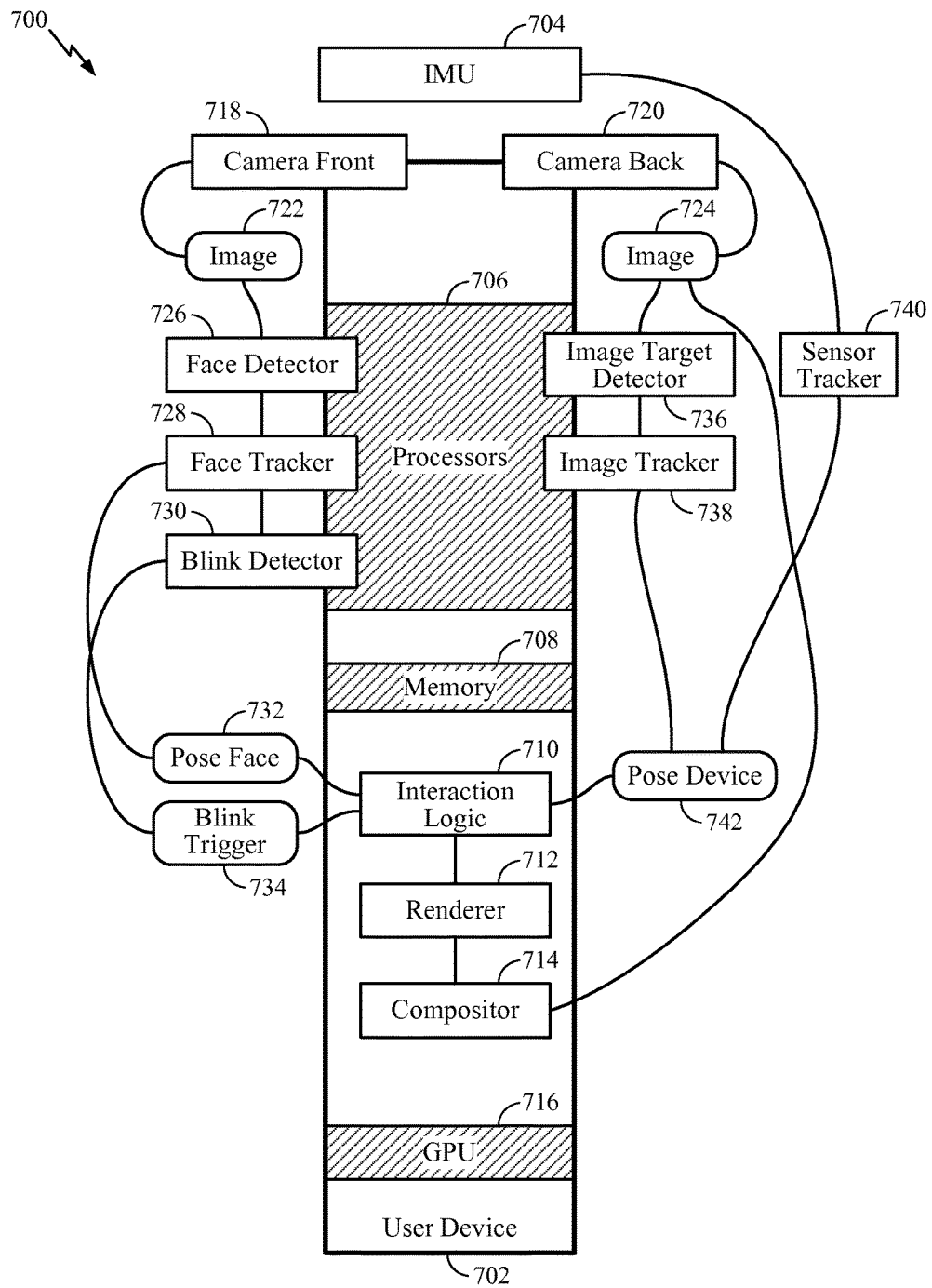
FIG. 7 illustrates a high-level block diagram of an augmented reality system according to implementations of the technology described herein.

FIG. 7 illustrates a high-level block diagram of an augmented reality system 700 according to implementations of the technology described herein. in one or more implementations, the augmented reality system 700 detects and tracks a position and orientation of a user's face with respect to a user device using user coordinate system, detects and tracks a position and orientation of a user device with respect to a target using a user device coordinate system, and maps the user coordinate system and the user device coordinate system to a global coordinate system. The augmented reality system 700 also continuously tracks the face of the user using the detected face of the user, the detected position of the user device, and the global coordinate system The illustrated system 700 includes a user device 702 having an optional inertial measurement unit (IMU) 704, one or more processors 706, memory 708, interaction logic 710, a renderer 712, a compositor 714, and a graphics processing unit (GPU) 716.

In one or more implementations, the user device 702 is a camera. In this implementation, the user device 702 includes a camera front 718 and a camera back 720. The camera front 718 faces a user of the user device 702, such as the user 102. The camera back 720 faces the scene where a target of the image is located, such as the target 106.

The illustrated camera front 718 captures an image 722. The illustrated camera back 720 captures an image 724.

The illustrated processor 706 includes a face detector 726, a face tracker 728, and a blink detector 730. The illustrated face detector 726, face tracker 728, and blink detector 730 process the image 722.

In one aspect, the illustrated face detector 726 detects the user 102's face in the image 722. The illustrated face tracker 728 tracks face movements of the user 102 using the output of the face detector 726. The illustrated face tracker 728 also determines whether the user 102 has posed his or her face using a pose face module 732. The illustrated blink detector 730 determines whether the user 102 has blinked (i.e., eye is open/closed) using the output of the face tracker 728, and uses this determination for a blink trigger module 734. Both the pose face module 732 output and the blink trigger module 734 output are provided to the interaction logic 710. The interaction logic 710 is described in greater detail below.

The illustrated processor 706 also includes an image target detector 736, an image tracker 738, and a sensor tracker 740. The illustrated an image target detector 736, image tracker 738, and sensor tracker 740 process the image 724. For example, the illustrated image target detector 736 detects a target in the image 724, such as the object 202. The illustrated image tracker 738 tracks movements of the target using the image target detector 736 output. The illustrated image tracker 738 tracks movements of the target using the image target detector 736 output. The illustrated image tracker 738 also determines whether the user device 702 is posed using a pose device module 742.

The illustrated sensor tracker 740 tracks the movement of the user device 702. The illustrated sensor tracker 740 optionally receives inertial information for the user device 702 from the inertial measurement unit (IMU) 704, and determines whether the user device 702 has moved. The illustrated sensor tracker 740 provides this determination to the pose device module 742. Alternatively, the sensor tracker 740 may implement techniques to determine the position of the user device 702. Such techniques may include using data from a network, including triangulation, Wi-Fi positioning, and the like.

Both the image tracker 738 output and the pose device 742 output are provided to the interaction logic 710. The interaction logic 710 output is provided to the renderer 712. The illustrated renderer 712 may be implemented using any suitable technology that is capable of generating visual elements of the scene in the image 722 and the image 724. The renderer 712 output is provided to the compositor 714.

In one or more implementations, the user device 702 is the same as or similar to the user device 104. The camera in the user device 702 may include a Charged Couple Device (CCD)-based image detector, a Complementary Metal Oxide Semiconductor (CMOS)-based image detector, or other suitable image detector.

In one or more implementations, the inertial measurement unit (IMU) 704 detects movement of the user device 702. The inertial measurement unit (IMU) 704 may be any device that is capable of measuring and reporting the user device 702's velocity, orientation, and gravitational forces. The inertial measurement unit (IMU) 704 may use a combination of accelerometers, gyroscopes, and/or magnetometers, for example.

In one or more implementations, the processor 706 is a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 706 may be used for processing information. The processor 706 can be supplemented by, or incorporated in, special purpose logic circuitry.

In one or more implementations, the memory 708 is Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 706. The memory 708 may store code that creates an execution environment for one or more computer programs used to implement technology described herein.

The illustrated compositor 714 may be implemented using any suitable technology that is capable of composing visual elements obtained from the renderer 712 into a single image. In one or more implementations, the compositor 714 digitally assembles the visual elements into a single image for display on the screen of the user device 702.

The illustrated graphics processing unit (GPU) 716 may be implemented using any suitable technology that is capable of processing the information received from the processor 706 and the memory 708 so that the images 722 and 724 can be displayed on the screen of the user device 702.

In one or more implementations, the pose face module 732 provides three degrees of freedom in translation of the user 102's face and three degrees of orientation of the user 102's face.

In one or more implementations, the blink trigger module 734 may generate Boolean on/off and/or eye open/close signals indicative of whether the user 102's eyes are open or closed. These signals may be used to turn label on and/or off on the screen of the user device 702.

The illustrated face detector 726, face tracker 728, and the blink detector 730 may be implemented using any suitable appearance-based face recognition techniques. Suitable appearance-based face recognition techniques include direct correlation techniques, eigenface techniques, or the like. The illustrated face detector 726 and face tracker 728 may be implemented without sensors.

Figure 8:
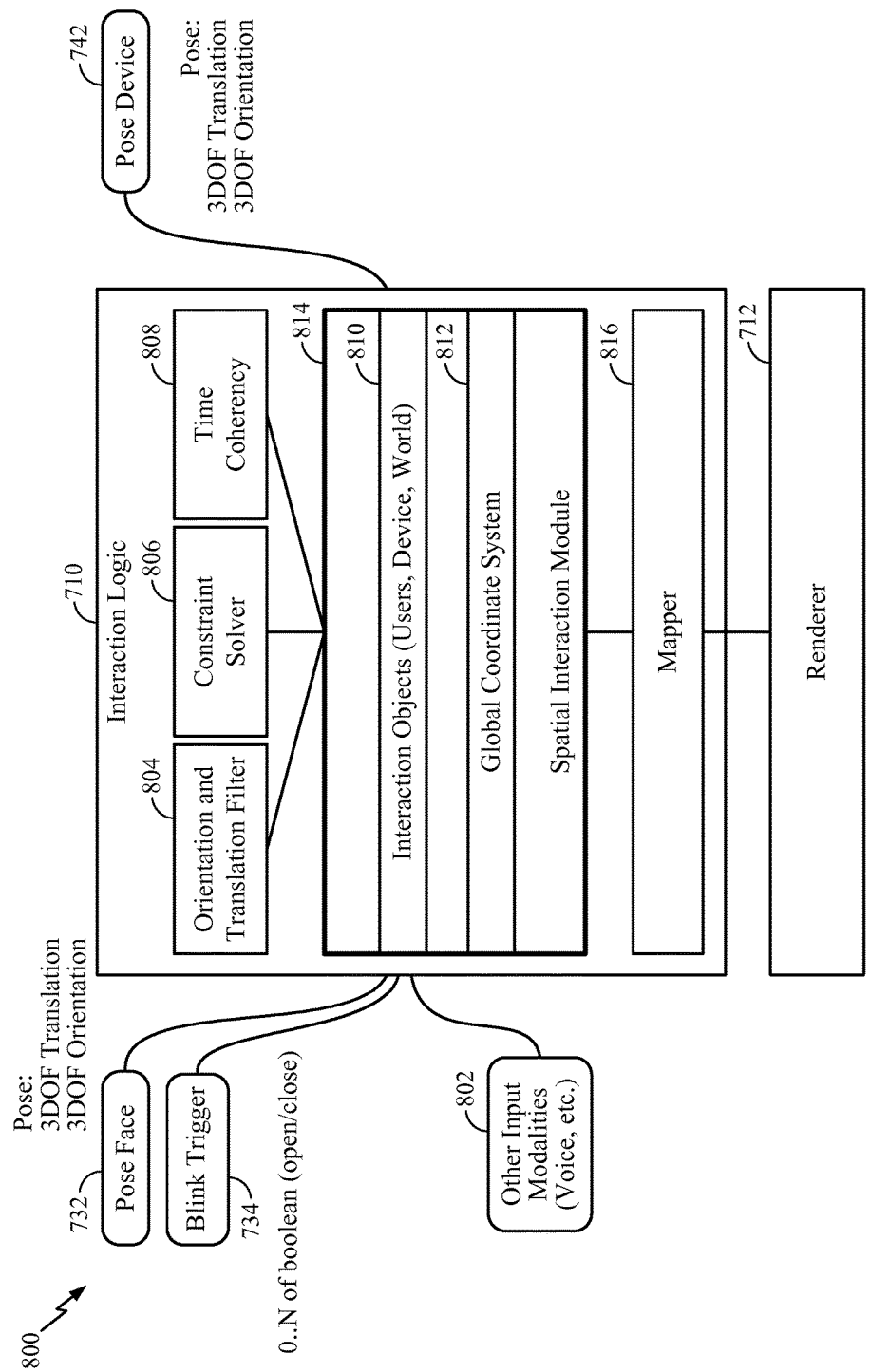
FIG. 8 illustrates a high-level block diagram of the interaction logic depicted in FIG. 7 according to an implementation of the technology described herein.

FIG. 8 illustrates a high-level block diagram of the interaction logic 710 according to one or more implementations. The illustrated interaction logic 710 receives inputs from the pose face module 732, the blink trigger module 734, the pose device module 742, and other input modalities 802. The illustrated interaction logic 710 provides an output to the renderer 712. In one or more implementations, the interaction logic 710 interprets changes in the position in orientation of the user 102's face, the appearance of the user 102's face (e.g., blinking and smirking), and the user device 702 position and orientation to provide actions in an augmented reality environment (e.g., augmented reality environments 100 and 200).

In one or more implementations, the other input modalities 802 typically include voice, lip movement, eye movement, speech, gestures, head, face, and body movements, keyboard, a digitizing tablet, etc. The other input modalities 802 also may include information that can be inferred from a user 102's face and/or that may affect the interaction space between the user device 702 and the target 106. For instance, other input modalities 802 can be inferred from a user 102's head position, a user 102's proximity to the user device 702, etc. Other input modalities 802 also have an effect on the interaction space behind the user device 702 on the scene-facing side.

The interaction logic 710 also includes an orientation and translation filter 804, a constraint solver 806, a time coherency module 808, an interaction objects module 810, a global coordinate system module 812, and a spatial interaction module 814, whose output is provided to a mapper 816.

The illustrated orientation and translation filter 804 may be used to provide three degrees of freedom of translation, e.g., for the user device 702 and/or the user 102. The illustrated orientation and translation filter 804 also may be used to provide three degrees of freedom of orientation, e.g., for the user device 702 and/or the user 102.

The illustrated constraint solver 806 may be used to alter the actual size and/or pixel ratio of the image 722 and/or 724.

The illustrated time coherency module 808 may ensure that timing for the side of the user device 702 that faces the user 102 is consistent with the timing for the side of the user device 702 that is facing the target 106.

In the illustrated implementation, the face pose module 732, the blink trigger 734, and other input modalities 802 are mapped to the interaction objects module 810. Interaction objects may be re-representations of interactive virtual and physical objects that are being tracked by the user device 702. The illustrated interaction objects module 810 provides a physically-based spatial representation (storage and logic) of the tracked objects that are accounted for through the augmented reality system 700.

In one or more implementations, the interaction objects module 810 is mapped to the global coordinate system module 812.

The illustrated spatial interaction module 814 holds and keeps updated the interaction objects in the interaction objects module 810 and provides data output to the mapper 816 that allows configurable actions to be visible in the rendering system 712. The data outputs may be proximities between the interaction objects 810.

The illustrated mapper 816 may make a determination as to what is to be rendered and/or what is to be displayed on the screen of the user device 702. Additionally, the mapper 816 may determine whether a sound is to be played on the user device 702.

Example Augmented Reality Method

FIG. 8 illustrates a high-level block diagram of the interaction logic 710 according to one or more implementations. The illustrated interaction logic 710 receives inputs from the pose face module 732, the blink trigger module 734, the pose device module 742, and other input modalities 802. The illustrated interaction logic 710 provides an output to the renderer 712. In one or more implementations, the interaction logic 710 interprets changes in the position in orientation of the user 102's face, the appearance of the user 102's face (e.g., blinking and smirking), and the user device 702 position and orientation to provide actions in an augmented reality environment (e.g., augmented reality environments 100 and 200).

In one or more implementations, the other input modalities 802 typically include voice, lip movement, eye movement, speech, gestures, head, face, and body movements, keyboard, a digitizing tablet, etc. The other input modalities 802 also may include information that can be inferred from a user 102's face and/or that may affect the interaction space between the user device 702 and the target 106. For instance, other input modalities 802 can be inferred from a user 102's head position, a user 102's proximity to the user device 702, etc. In other words, the other input modalities 802 can have an effect on the interaction space behind the user device 702 on the scene-facing side.

The interaction logic 710 also includes an orientation and translation filter 804, a constraint solver 806, a time coherency module 808, an interaction objects module 810, a global coordinate system module 812, and a spatial interaction module 814, whose output is provided to a mapper 816.

The illustrated orientation and translation filter 804 may be used to provide three degrees of freedom of translation, e.g., for the user device 702 and/or the user 102. The illustrated orientation and translation filter 804 also may be used to provide three degrees of freedom of orientation, e.g., for the user device 702 and/or the user 102.

The illustrated constraint solver 806 may be used to alter the actual size and/or pixel ratio of the image 722 and/or 724.

The illustrated time coherency module 808 may ensure that timing for the side of the user device 702 that faces the user 102 is consistent with the timing for the side of the user device 702 that is facing the target 106.

In the illustrated implementation, the face pose module 732, the blink trigger 734, and other input modalities 802 are mapped to the interaction objects module 810. Interaction objects may be re-representations of interactive virtual and physical objects that are being tracked by the user device 702. The illustrated interaction objects module 810 provides a physically-based spatial representation (storage and logic) of the tracked objects that are accounted for through the augmented reality system 700.

In one or more implementations, the interaction objects module 810 is mapped to the global coordinate system module 812.

The illustrated spatial interaction module 814 holds and keeps updated the interaction objects in the interaction objects module 810 and provides data output to the mapper (816) that allows configurable actions to be visible in the rendering system 712. The data outputs may be proximities between the interaction objects 810. The illustrated mapper 816 merges the data from the face tracker 728 and the image tracker 738, which are continuously running at the same time (i.e., concurrently), such that a face pose orientation and translation (coordinates), and device orientation and translation (coordinates) are merged together. The mapper 816 may make a determination as to what is to be rendered and/or what is to be displayed on the screen of the user device 702. Additionally, the mapper 816 may determine whether a sound is to be played on the user device 702.

Figure 9:
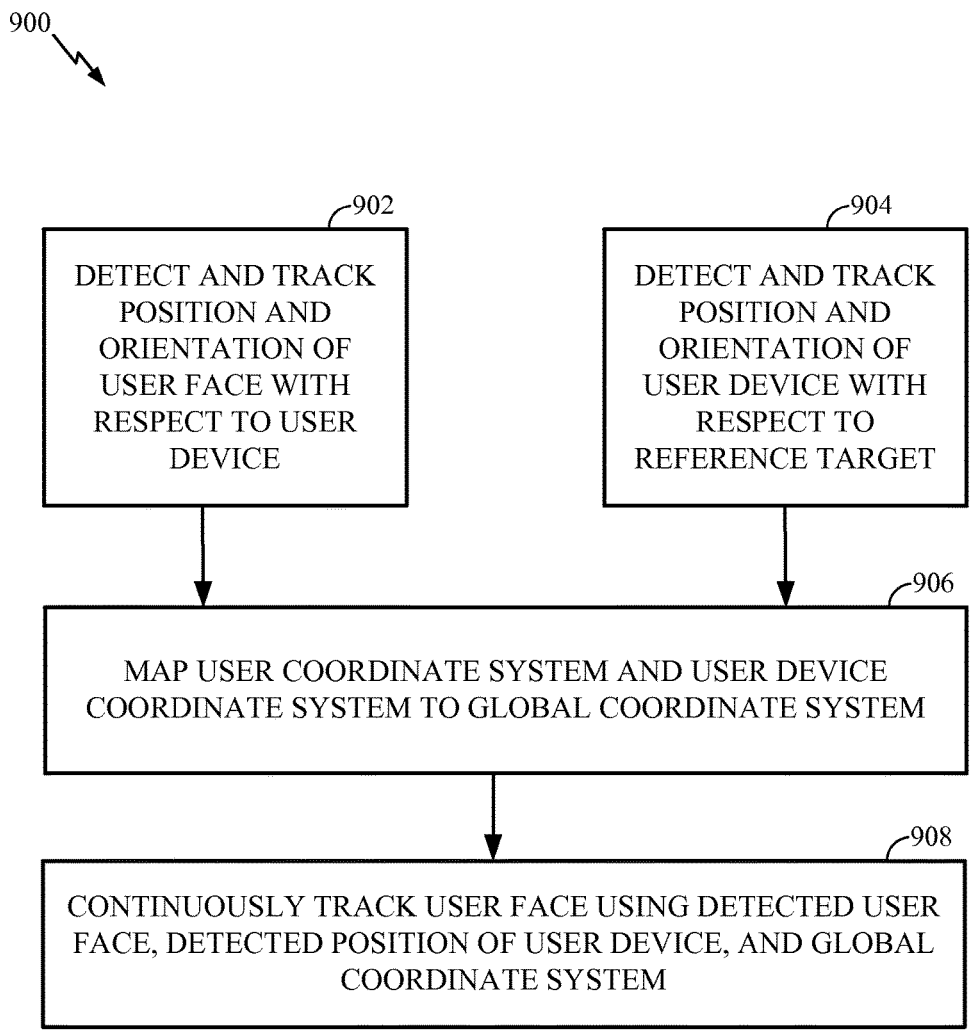
FIG. 9 is a flowchart of a method of operating the augmented reality environment depicted in FIG. 7 according to an implementation of the technology described herein.

FIG. 9 is a flowchart of a method of how the augmented reality environment 700 operates according to implementations of the technology described herein.

In a block 902, the method 900 detects and tracks the position and orientation of a user's face with respect to a user device. In one aspect, the user device 702 receives an image stream from the user 102 side of the user device 702. In one or more implementations, the face detector 726 detects the position and orientation of the user 102's face with respect to the user device 702. In one or more implementations, the face tracker 728 tracks the position and orientation of the user 102's face with respect to the user device 702.

In a block 904, the method 900 detects and tracks the position and orientation of the user device with respect to a target in a scene. In one aspect, the user device 702 receives an image stream from an image stream from the target 106. In one or more implementations, the image target detector 736 detects the position and orientation of the user device 104 with respect to target 106. In one or more implementations, the image tracker 738 tracks the position and orientation of the user device 702 with respect to target 106.

In a block 906, the method 900 combines a user coordinate system and a user device coordinate system into a global coordinate system. In one or more implementations, the interaction logic 710 combines the coordinate system 114 and the coordinate system 116 to the coordinate system 118. In one or more implementations, the interaction logic 710 merges the data from the face tracker 728 and the image tracker 738 so that the pose orientation and translation coordinates 114 and the user device 702 orientation and translation coordinates 116 are combined together into the coordinate system 118.

In a block 908, the method 900 continuously tracks the user's face using the detected position and orientation of a user's face with respect to a user device, the detected position and orientation of a user's face, and the global coordinate system. In one or more implementations, the face tracker 728 continuously tracks the user's face using the detected position and orientation of a user 102's face with respect to the user device 702, the detected position and orientation of the user 102's face, and the coordinate system 118.

Aspects of the technology described herein and related drawings are directed to specific implementations of the technology. Alternative implementations may be devised without departing from the scope of the technology described herein. Additionally, well-known elements of the technology will not be described in detail or will be omitted so as not to obscure the relevant details.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the order described above. Furthermore, not every illustrated step and decision may be required in every implementation/variant in accordance with the technology described herein, while some steps and decisions that have not been specifically illustrated may be desirable or necessary in some implementation/variants in accordance with the technology described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present technology described herein.

The various illustrative logical blocks, modules, and circuits described in connection with the implementation disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed implementations is provided to enable any person skilled in the art to make or use the technology described herein. Various modifications to these implementations will be readily apparent to those skilled in the art, and the generic principles defined herein may be applied to other implementations without departing from the spirit or scope of the technology described herein. Thus, aspects of the technology described herein are not intended to be limited to the implementations shown herein, but is to be accorded the widest scope consistent with the principles and novel features disclosed herein.

What is claimed is:

1. An apparatus for performing spatial interaction of a user and a user device, comprising:
   at least one processor of the user device configured to:
      cause an image tracker to detect and track in a first coordinate system a position and orientation of a face of the user relative to the user device;
      cause a sensor tracker to detect and track in a second coordinate system a position and orientation of the user device relative to a target;
      map the first coordinate system and the second coordinate system to a global coordinate system;
      continuously track the face of the user based on the detected position and orientation of the face of the user, the detected position and orientation of the user device, and the global coordinate system;
      receive input from the user comprising at least a gaze of the user, wherein the gaze of the user is determined based at least in part on the face of the user being continuously tracked; and
      manipulate a representation of the target displayed on a user interface of the user device based on the input from the user and the position or orientation of the user device, wherein manipulation of the representation of the target comprises display of an exploded view of the representation of the target based on the gaze of the user.

2. The apparatus of claim 1, wherein the sensor tracker is configured to:
   detect movement of the user device;
   track movement of the user device;
   detect the target; or
   continuously track movement of the target.

3. The apparatus of claim 1, wherein the image tracker is configured to:
   detect the face of the user;
   track movement of the face of the user; or
   determine whether the user has blinked and to trigger the user device based on the user having blinked.

4. The apparatus of claim 1, wherein the at least one processor is further configured to interpret three degrees of freedom in front of the user device and three degrees of freedom behind the user device.

5. The apparatus of claim 1, wherein the first coordinate system is a face-to-device coordinate system in front of the user device.

6. The apparatus of claim 1, wherein the second coordinate system is a device-to-target coordinate system behind the user device.

7. The apparatus of claim 1, wherein the global coordinate system comprises a real-world coordinate system.

8. A method for performing spatial interaction of a user and a user device, comprising:
   detecting and tracking in a first coordinate system a position and orientation of a face of the user relative to the user device;
   detecting and tracking in a second coordinate system a position and orientation of the user device relative to a target;
   mapping the first coordinate system and the second coordinate system to a global coordinate system;
   continuously tracking the face of the user based on the detected face of the user, the detected position of the user device, and the global coordinate system;
   receiving input from the user comprising at least a gaze of the user, wherein the gaze of the user is determined based at least in part on the face of the user being continuously tracked; and
   manipulating a representation of the target displayed on a user interface of the user device based on the input from the user and the position or orientation of the user device, wherein manipulation of the representation of the target comprises display of an exploded view of the representation of the target based on the gaze of the user.

9. The method of claim 8, further comprising at least one of:
   detecting movement of the user device;
   tracking movement of the user device;
   detecting the target; or
   continuously tracking movement of the target.

10. The method of claim 8, further comprising at least one of:
    detecting the face of the user;
    tracking movement of the face of the user; or
    determining whether the user has blinked and triggering the user device based on the user having blinked.

11. The method of claim 8, further comprising interpreting three degrees of freedom in front of the user device and three degrees of freedom behind the user device.

12. The method of claim 8, wherein the first coordinate system is a face-to-device coordinate system in front of the user device.

13. The method of claim 8, wherein the second coordinate system is a device-to-target coordinate system behind the user device.

14. The method of claim 8, wherein the global coordinate system comprises a real-world coordinate system.

15. An apparatus for performing spatial interaction of a user and a user device, comprising:
    means for detecting and tracking in a first coordinate system a position and orientation of a face of the user relative to the user device;

means for detecting and tracking in a second coordinate system a position and orientation of the user device relative to a target;

means for mapping the first coordinate system and the second coordinate system to a global coordinate system;

means for continuously tracking the face of the user based on the detected face of the user, the detected position of the user device, and the global coordinate system;

means for receiving input from the user comprising at least a gaze of the user, wherein the gaze of the user is determined based at least in part on the face of the user being continuously tracked; and means for manipulating a representation of the target displayed on a user interface of the user device based on the input from the user and the position or orientation of the user device wherein manipulation of the representation of the target comprises display of an exploded view of the representation of the target based on the gaze of the user.

16. The apparatus of claim 15, further comprising at least one of:

means for detecting movement of the user device;
means for tracking movement of the user device;
means for detecting the target; or
means for continuously tracking movement of the target.

17. The apparatus of claim 15, further comprising at least one of:

means for detecting the face of the user;
means for tracking movement of the face of the user; or
means for determining whether the user has blinked and triggering the user device based on the user having blinked.

18. The apparatus of claim 15, further comprising means for interpreting three degrees of freedom in front of the user device and three degrees of freedom behind the user device.

19. The apparatus of claim 15, wherein the first coordinate system is a face-to-device coordinate system in front of the user device.

20. The apparatus of claim 15, wherein the second coordinate system is a device-to-target coordinate system behind the user device.

21. The apparatus of claim 15, wherein the global coordinate system comprises a real-world coordinate system.

22. A non-transitory computer-readable medium including one or more instructions comprising:

at least one instruction instructing a user device to detect and track in a first coordinate system a position and orientation of a face of a user relative to the user device;

at least one instruction instructing the user device to detect and track in a second coordinate system a position and orientation of the user device relative to a target;

at least one instruction instructing the user device to map the first coordinate system and the second coordinate system to a global coordinate system;

at least one instruction instructing the user device to continuously track the face of the user based on the detected face of the user, the detected position of the user device, and the global coordinate system;

at least one instruction instructing the user device to receive input from the user comprising at least a gaze of the user, wherein the gaze of the user is determined based at least in part on the face of the user being continuously tracked; and at least one instruction instructing the user device to manipulate a representation of the target displayed on a user interface of the user device based on the input from the user and the position or orientation of the user device, wherein manipulation of the representation of the target comprises display of an exploded view of the representation of the target based on the gaze of the user.

23. The non-transitory computer-readable medium of claim 22, further comprising:

at least one instruction instructing the user device to detect movement of the user device;
at least one instruction instructing the user device to track movement of the user device;
at least one instruction instructing the user device to detect the target; or
at least one instruction instructing the user device to continuously track movement of the target.

24. The non-transitory computer-readable medium of claim 22, further comprising:

at least one instruction instructing the user device to detect the face of the user;
at least one instruction instructing the user device to track movement of the face of the user; or
at least one instruction instructing the user device to determine whether the user has blinked and triggering the user device based on the user having blinked.

25. The non-transitory computer-readable medium of claim 22, further comprising at least one instruction instructing the user device to interpret three degrees of freedom in front of the user device and three degrees of freedom behind the user device.

26. The non-transitory computer-readable medium of claim 22, wherein the first coordinate system is a face-to-device coordinate system in front of the user device and the second coordinate system is a device-to-target coordinate system behind the user device.

27. The non-transitory computer-readable medium of claim 22, further comprising at least one instruction instructing the user device to interpret three degrees of freedom in front of the user device.

28. The non-transitory computer-readable medium of claim 22, further comprising at least one instruction instructing the user device to interpret three degrees of freedom behind the user device.

29. The non-transitory computer-readable medium of claim 22, further comprising at least one instruction instructing the user device to determine that the user has moved relative to the user device.

30. The non-transitory computer-readable medium of claim 22, further comprising at least one instruction instructing the user device to determine that the user device has moved relative to the target.

31. The apparatus of claim 1, wherein the image tracker comprises a hardware component coupled to the at least one processor, a software module executed by the at least one processor, or a combination of hardware and software, and wherein the sensor tracker comprises a hardware component coupled to the at least one processor, a software module executed by the at least one processor, or a combination of hardware and software.

32. The apparatus of claim 1, wherein the at least one processor being configured to manipulate comprises the at least one processor being configured to display an increase in a zoom level of the representation of the target based on the gaze of the user.

33. The apparatus of claim 1, wherein the at least one processor being configured to manipulate comprises the at least one processor being configured to display an x-ray view of the representation of the target.

34. The apparatus of claim 1, wherein the at least one processor being configured to manipulate comprises the at least one processor being configured to change a level of detail of the representation of the target based on a direction of the gaze of the user.

35. The apparatus of claim 32, wherein the zoom level of the representation of the target is increased based on a direction of the gaze of the user.

\* \* \* \* \*